US007357194B2

(12) United States Patent
Koschel et al.

(10) Patent No.: US 7,357,194 B2
(45) Date of Patent: Apr. 15, 2008

(54) PERCUSSION POWER TOOL

(75) Inventors: Christian Koschel, Augsburg (DE); Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/635,263

(22) Filed: Dec. 6, 2006

(65) Prior Publication Data

US 2007/0125564 A1 Jun. 7, 2007

(30) Foreign Application Priority Data

Dec. 7, 2005 (DE) ..................... 10 2005 000 179

(51) Int. Cl.
*B23B 45/16* (2006.01)
*B25D 11/06* (2006.01)

(52) U.S. Cl. ........................ 173/210; 173/93; 173/117

(58) Field of Classification Search ................ 173/210, 173/93, 100, 104, 117, 128, 171
See application file for complete search history.

(56) References Cited

U.S. PATENT DOCUMENTS 3,168,324 A * 2/1965 Kennell ...................... 173/137
3,559,753 A * 2/1971 Meri et al. .................. 173/137
5,050,687 A * 9/1991 Prokhorov et al. ......... 173/133
5,056,701 A * 10/1991 Bereiter ....................... 227/10
5,370,193 A * 12/1994 Sippus et al. ............... 173/211
5,688,163 A * 11/1997 Siden .......................... 451/342
6,092,814 A * 7/2000 Kageler ..................... 279/19.4
6,182,881 B1 * 2/2001 Kellner et al. ................ 227/10
6,227,307 B1 * 5/2001 Lee ............................. 173/78
6,241,026 B1 * 6/2001 Wache et al. ............... 173/132
6,510,904 B1 * 1/2003 Tyrrell ........................ 173/132
6,675,908 B1 * 1/2004 Frauhammer et al. ........ 173/48
6,705,409 B2 * 3/2004 Paul ........................... 173/132
7,131,563 B2 * 11/2006 Wen ........................... 227/130
2004/0231869 A1 * 11/2004 Bernhart et al. ............ 173/210
2006/0124334 A1 * 6/2006 Hetcher et al. ............. 173/201

* cited by examiner

*Primary Examiner*—Rinaldi I. Rada
*Assistant Examiner*—Paul Durand
(74) *Attorney, Agent, or Firm*—Abelman, Frayne & Schwab

(57) ABSTRACT

A percussion power tool includes a motor (6) located in the tool-housing (4) for driving the output member (12) and the percussion mechanism (10), a chuck (20) for receiving a working tool (22), a locking mechanism (24) for securing the chuck (20) on the output member (12) and including at least one locking member (26) which provides in a locking position thereof, for a formlocking connection between a connection member (30) of the chuck (20) and the output member (12), an adjusting sleeve (34) that prevents, in its blocking position, a radial displacement of the at least one locking member (26) from the locking position and a damping member (56) provided between the output member (12) and the connection member (30) and acting in the axial direction.

4 Claims, 2 Drawing Sheets

PERCUSSION POWER TOOL

BACKGROUND OF THE INVENTION

1. Field of the Invention

The present invention relates to a percussion power tool and, in particular to an electro-pneumatic hammer drill and/or chisel hammer that includes a motor located in the tool housing for driving the output member and a percussion mechanism. The percussion power tool further has a chuck for receiving a working tool displaceable along a longitudinal axis by the percussion mechanism, and a locking mechanism for releasably securing the chuck on the output member. The locking mechanism has at least one locking member which provides in its locking position for a formlocking connection between a connection member of the chuck and the output member. The locking member is displaceable in a radial, with respect to the longitudinal axis of the tool, direction into a release position in which the formlocking connection of the connection member of the chuck and the output member is lifted off, so that the chuck can be lifted off the output member. There is further provided an adjusting sleeve that prevents, in its blocking position, a radial displacement of the at least one locking member from the locking position thereof. The adjusting sleeve is displaceable against a biasing force into a release position in which the at least one locking member is displaceable into its release position.

2. Description of the Prior Art

In percussion power tools as described above, the chuck can be comfortably lifted off the tool, e.g., in order to be replaced by a new chuck or any other type of a working tool holder.

German Publication DE 34 43 186 A1 discloses a hand-held power tool having a sleeve-shaped output member in which a die is displaceable and on which a chuck is mounted. The tool further includes radially displaceable holding elements which provide for an axial formlocking connection between a connection member of the chuck and the output member. In their locking position, the holding elements are supported by an adjusting sleeve displaceable in a direction opposite the operational direction of the tool by a spring and toward a circlip. In order to lift the chuck off the output member, the adjusting sleeve is displaced in the operational direction against the biasing force of the spring so that the holding elements can be displaced radially outwardly, lifting off the formlocking connection between the chuck and the output member.

The drawback of the power tool described above consists in that during operation, in particular during an idle stroke, the die impacts an axial stop of the sleeve-shaped output member, and a very large portion of the impact energy is transmitted to the adjusting sleeve by the connection member and the circlip mounted thereon. The impact energy acting on the adjusting sleeve is often sufficient to displace the adjusting sleeve in the operational direction so far that the holding members can displace in their release position. This results in many cases in inadvertent falling of the chuck off of the power tool.

Accordingly, the object of the present invention is to provide a percussion power tool in which the drawback off the known power tool is eliminated and an inadvertent falling of the chuck off the tool is prevented.

SUMMARY OF THE INVENTION

This and other objects of the present invention, which will become apparent hereinafter, are achieved by providing, between the output member and the connection member, a damping member acting in the axial direction.

By providing a damping member, a portion of the impact energy which is transmitted to the adjusting sleeve, can be reduced to such an extent that even at an idle stroke of the die in which the die acts on the connection member, it cannot transmit an adequate pulse to the adjusting sleeve to displace the sleeve into a release position. Thus, an undesired displacement of the adjusting sleeve from its blocking position is prevented. Thereby, the locking member is reliably held in its locking position. Therefore, even during an idle stroke, the chuck is reliably held on the output member.

Advantageously, the output member has a receptacle for receiving the damping member. This insures an exact axial positioning of the damping member which, in turn, insures an adequate decrease of the impact energy between the output member and the chuck.

Advantageously, a die stop is provided on a side of the output member remote from the percussion mechanism. This insures a reliable support of the damping member in the direction opposition the operational direction, without use of additional elements to this end. Rather, with the die stop, an already available part is used to axially limit the damping member receptacle.

It is advantageous when the damping member has a radially extending clamp element that is received in a clamp recess formed in the output member. Thereby, the damping member can be completely secured on the output member in a particular simple manner.

It is advantageous when the damping member has, in its unloaded condition, an axial length which is greater than an axial distance between a bearing region of the connection member and an adjacent support region of the die stop in a mounted condition of the chuck. As a result, in the locking position of the locking mechanism, the damping member is preloaded, compressed, axially and presses the chuck away from the output member. This insures, on one hand, a very good damping and, on the other hand, a particularly good positioning of the chuck relative to the output member. In particular, the clearance necessary to insure the radial displacement of the locking member, is compensated. Thereby, the disturbing noise and an increased wear of the locking member or the locking member-receiving means are prevented.

It is advantageous when the damping member is formed as an annular member. This substantially simplifies the manufacturing of the damping member.

Furthermore, in many cases, conventional damping elements can be used, which reduces manufacturing costs of the tool.

Advantageously, the damping member is formed of an elastomeric material, which permits to achieve a satisfactory reduction of the impact energy between the output member and the chuck and, thereby, a sufficient reduction of acceleration of the adjusting sleeve in the operational direction.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
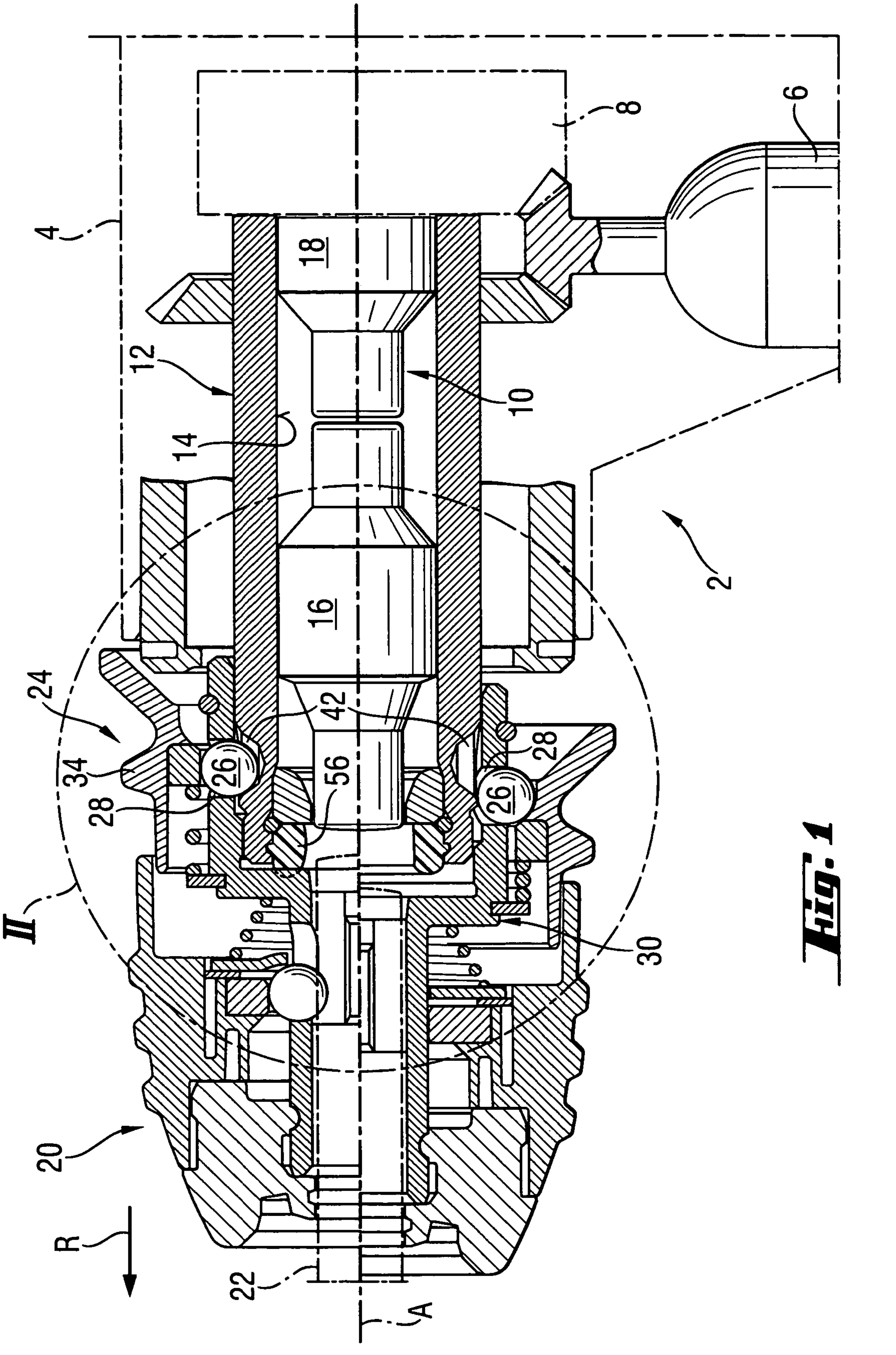
FIG. 1 a longitudinal cross-sectional view of a front portion of a percussion power tool according to the present invention.

A percussion power tool 2 according to the present invention, a front portion of which is shown in FIG. 1 and which is formed as a hammer drill, includes a housing 4 in which a motor 6 is arranged. As schematically shown in FIG. 1, the motor 6 drives a driver 8 of a percussion mechanism 10 and rotates a output member 12. The output member 12 is formed as a tubular member in a longitudinal bore 14 of which a die 16 of the percussion mechanism 10 is displaceable. The die 16 is impacted by a striker 18 driven by the driver 8.

A chuck 20 for receiving a working tool 22 formed, e.g., as a drill or chisel, is mounted on the output member 12 and is releasably secured thereon with a locking mechanism 24. During an operation, the chuck 20 rotates, together with the output member 12, about a common axis A. Simultaneously, the percussion mechanism 10 impacts the working tool 22 received in the chuck 20 in the operational direction R parallel to the axis A.

Figure 2:
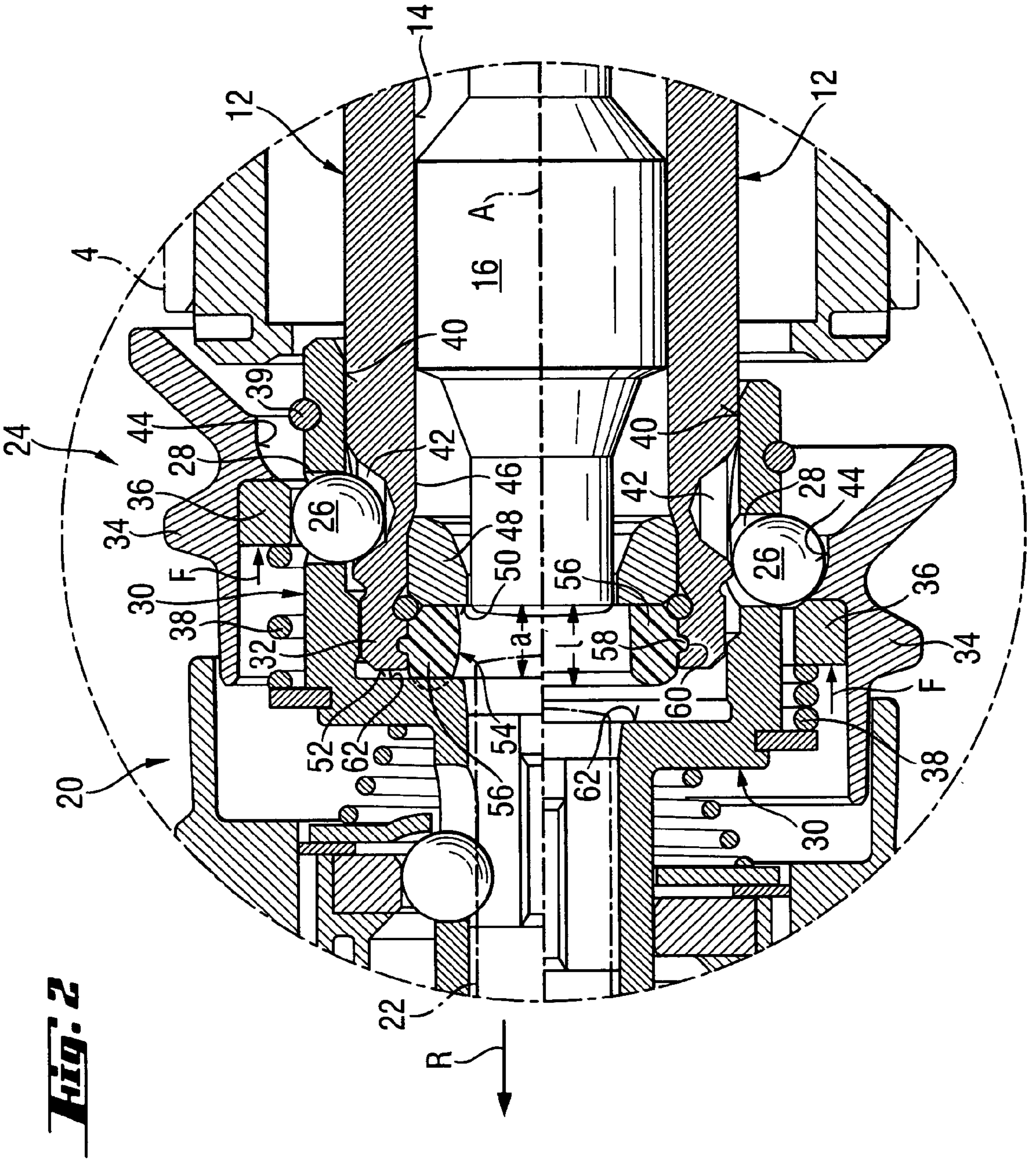
FIG. 2 a cut-out II in FIG. 1 showing the locking mechanism of the percussion power tool of FIG. 1.

In the upper, with respect to the axis A, portions of FIGS. 1 and 2, the locking mechanism 24 is shown in the locking position in which the chuck 20 is secured on the output member 12. The respective lower, with respect to the axis A, portions of FIGS. 1 and 2 show a release position of the locking mechanism 24 in which the chuck 20 can be removed, as shown, from the percussion power tool 2 in the operational direction R.

As particularly shown in FIG. 2, the locking mechanism 24 includes a ball-shaped locking member 26 which is held in a radial bore 28 of a cup-shaped connection member 30 of the chuck 20 with a possibility of radial displacement relative to the axis A. A free end 32 of the output member 12 is also arranged in the connection member 30. The displacement of the locking members 26 radially outwardly is limited by an adjusting sleeve 34 with a ball race ring 36 received therein.

In the locking position of the locking mechanism 24, which is shown in the upper portion of FIG. 2, the adjusting sleeve 34 is biased into a blocking position with a biasing force F of a spring 38 and engages a circlip 39 provided on the connection member 30. In the blocking position of the sleeve 34, the locking member 26 is supported against the ball race ring 36 and projects outwardly from the inner wall 40 of the connection member 30. The locking member 26 projects into locking recess 42 formed in the output member 12. In this way, the locking member 26 provides a form-locking connection between the output member 12 and the connection member 30, whereby the chuck 20 becomes secure on the output member 12.

The adjusting sleeve 34 can be displaced by a percussion power tool user against the biasing force F in the operational direction R to its release position which is shown in the lower portion of FIGS. 1 and 2. As it is particularly shown in FIG. 2, only one recess 44 of the adjusting sleeve 34 is provided at the axial height of the bore 28. The recess 44 provides for a radial displacement of the locking member 26 outwardly until the locking member 26 is completely displaced out of locking recess 42. Thereby, the formlocking connection of the connection member 30 with the output member 12 by the locking member 26 is lifted off, and the chuck 20 can be displaced in the operational direction R and, thereby, lifted off the percussion power tool 2.

As further shown in FIG. 2, on an inner surface 46 of the longitudinal bore 14 of the output member 12, there is provided a die stop 48 that is fixedly connected with the output member 12 and limits the axial displacement of the die 16 in the operational direction R. At its side remote from the die 16, the die stop 48 forms a support region 50 which is axially offset with respect to an end surface 52 of the output member 12. Thereby, the die stop 48 and the output member 12 form together an annular receptacle 54 for receiving a likewise annular, damping member 56 formed of an elastomeric material. On the damping member 56, there is further formed a rib-shaped, extending radially outwardly, clamp element 60 which is pressed into a groove-shaped clamp recess 60 formed in the inner surface 46 of the output member 12.

In the locking position of the locking mechanism 24, as shown in the upper portion of FIG. 2, the damping member 56 abuts a bearing region 62 of the connection member 30 adjacent to the output member 12. The damping member 56 has, as it is particularly shown in the lower portion of FIG. 2, an axial length I that is greater than the axial distance a between the bearing region 62 and the support region 50 of the die stop 48 in the locking position of the chuck 20, as shown in the upper portion of FIG. 2.

In the locking position shown in the upper portion of FIG. 2, the damping member 56 is compressed and presses the connection member 30 away from the output member 12. The compressed position of the damping member 56 prevents chatter and excessive wear of the locking member 26 in the radial bore 28, which would have taken place, as a result of backlash in the absence of the compression or loading of the damping member 56. The backlash is a result of the need to insure radial displacement of the locking member 26.

During the operation, particularly during an idle stroke, the hard impact of the die 16 on the die stop 48 is transmitted to the bearing region 62 by the damping member 56. As a result, the impact energy, which is applied to the connection member 30 is noticeably reduced. As a result, a noticeably reduced axial pulse is imparted by the circlip 39 to the adjusting sleeve 34 in the operational direction R. This reduced pulse is not capable, at the predetermined design of the percussion power tool 2, to accelerate the adjusting sleeve 34 against the biasing force F from its blocking position and into its release position. This, in turn, prevents displacement of the locking member 26 from its locking position to its release position. Thus, an accidental loosening or release of the locking mechanism 24 and falling of the chuck 20 off the percussion power tool 2 is prevented.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A percussion power tool, comprising:

a housing (4);

a output member (12);

a percussion mechanism (10);

a motor (6) located in the housing (4) for driving the output member (12) and the percussion mechanism (10);

a chuck (20) for receiving a working tool (22) displaceable along a longitudinal axis (A) by the percussion mechanism (10);

a locking mechanism (24) for securing the chuck (20) on the output member (12), the locking mechanism (24) including at least one locking member (26) which provides in a locking position thereof, for a formlocking connection between a connection member (30) of the chuck (20) and the output member (12) and which is displaceable in a radial direction into a release position thereof in which the formlocking connection of the connection member (30) of the chuck (20) and the output member (12) is lifted off, so that the chuck (20) can be lifted off the output member (12);

an adjusting sleeve (34) that prevents, in a blocking position thereof, a radial displacement of the at least one locking member (26) from the locking position thereof, and that is displaceable against a biasing force (F) into a release position in which the at least one locking member (26) is displaceable into the release position thereof; and a damping member (56) provided between the output member (12) and the connection member (30) and acting in the axial direction, wherein the output member (12) has a receptacle (54) for receiving the damping member (56), wherein the percussion mechanism (24) includes a die (16); and the damping member (56) is arranged on a side of a die stop (48) remote from the percussion mechanism (10), and wherein the damping member (56) has, in an unloaded condition thereof, an axial length (I) which is greater than an axial distance (a) between a bearing region (62) of the connection member (30) and an adjacent support region (50) of the die stoop (48) in a mounted condition of the chuck (20).

2. A percussion power tool according to claim 1, wherein the damping member (56) has a radially extending clamp element (58) that is received in a clamp recess (60) formed in the output member (12).

3. A percussion power tool according to claim 1, wherein the damping member (56) is formed as an annular body.

4. A percussion power tool according to claim 1, wherein the damping member (56) is formed of an elastomeric material.

* * * * *